Aug. 8, 1933.  C. E. MILLER  1,921,631
FRUIT PICKER'S CARRIAGE
Filed Feb. 27, 1932  2 Sheets-Sheet 1
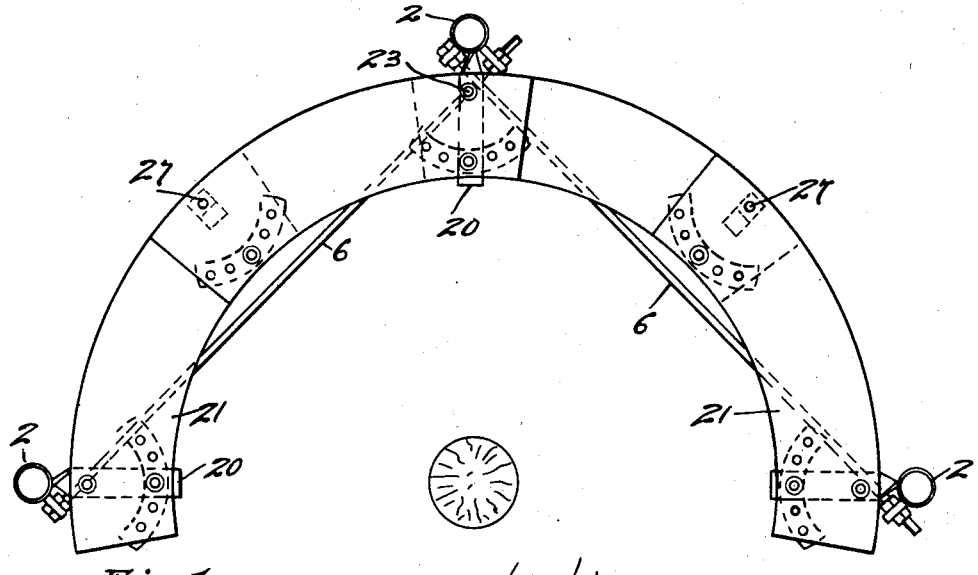
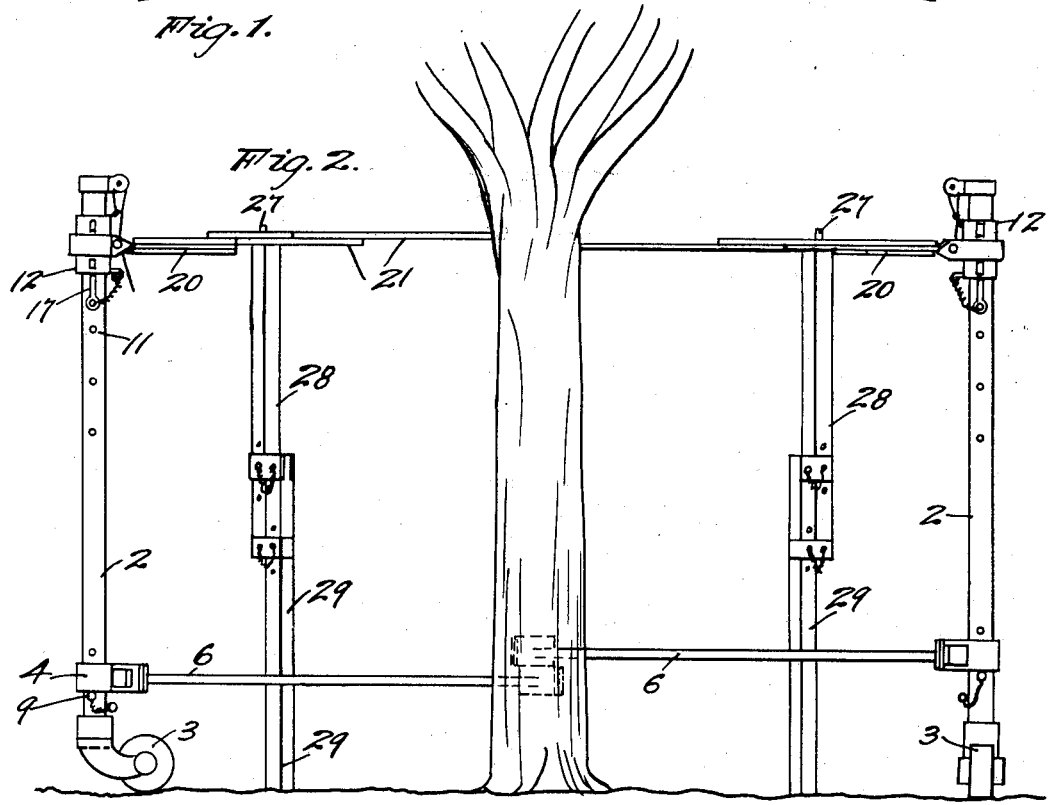
INVENTOR,
C. E. Miller;
BY F. E. Maynard
ATTORNEY.

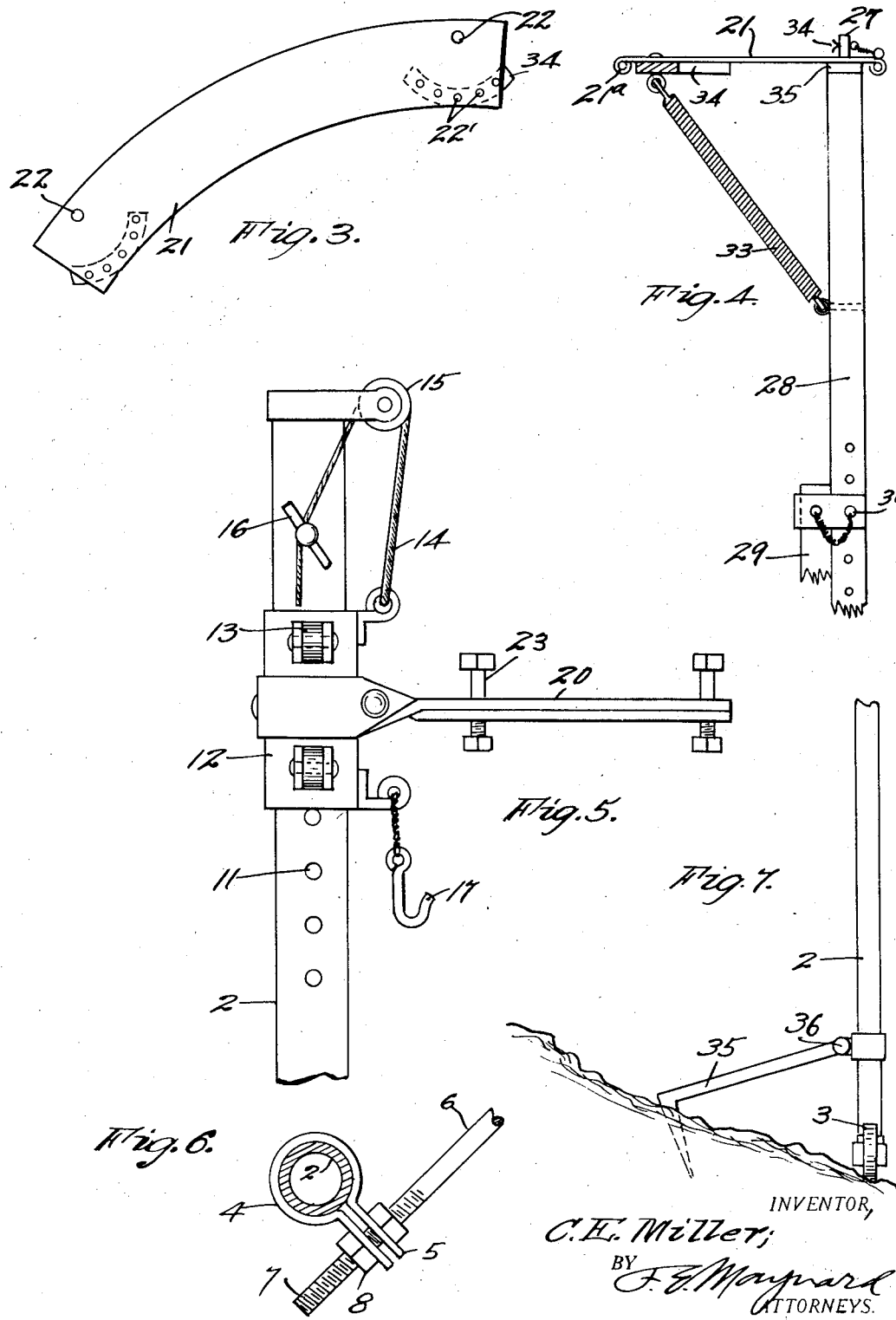

Patented Aug. 8, 1933

1,921,631

UNITED STATES PATENT OFFICE 1,921,631

FRUIT PICKER'S CARRIAGE

Claus E. Miller, Los Angeles, Calif.

Application February 27, 1932. Serial No. 595,531

1 Claim. (Cl. 304—2)

This invention relates to apparatus to facilitate the picking of fruit or other crop from trees in groves or orchards.

It is an object of the present invention to provide a readily shiftable, easily set up and easily knocked down, collapsible fruit picker's carriage.

A further object is to provide a wheeled, fruit picker's carriage in which there is incorporated a system of adjustable main columns and a system of auxiliary props severally adapted for vertical adjustment to predetermine the level or height above ground of an applicable, knockdown picker's platform.

A further object is to provide a collapsible, rollable, and at the same time a light and substantial skeleton form of carriage including a platform, preferably of segments of an annulus, which can be set up in more or less of a semicircular plan to be shifted into place about a tree, whose ripening crop is to be gathered, so that at one positioning of the carriage at a tree, a very considerable range of footway about the tree may be had to expedite the picking with the least injury to the tree and beating down of the cultivated earth about a tree.

Various safety devices are incorporated to reduce hazard of pickers using the apparatus.

This invention consists in certain advancements in this art as set forth in the ensuing disclosure and has, with the above, additional objects and advantages as hereinafter developed, and whose construction, combination and details of means and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a plan of the carriage as positioned about the trunk of a tree.

Figure 2 is a vertical elevation of the carriage in position.

Figure 3 is a detail plan of one of the platform elements.

Figure 4 is a side elevation of an end of one of the platform elements as superimposed on an auxiliary prop.

Figure 5 is a detail view of the upper end of one of the platform columns with an adjustable platform bracket thereon.

Figure 6 is a horizontal section through the lower portion of a column and showing, in plan, a column brace.

Figure 7 shows the lower end of a column as provided with a claw anchor for holding the carriage when in position on a hillside.

In its illustrated embodiment, the apparatus includes a suitable number of like columns 2 preferably of heavy iron pipe stepped at their lower ends on free casters 3 whereby to facilitate rolling of the erected structure from tree to tree in a grove or orchard. Adjacent the lower end of each column there is provided a slidable split ring 4 having spaced clamp arms 5, Fig. 6, through which are passed a substantial tie rod 6 having threaded ends 7 with clamp nuts 8 on opposite sides of the clamp arms 5 so that after the slidable collar has been shifted to the desired elevation, it can be clamped in place by tightening up the nuts 8 which have the further function of locking the tie rod 6 at desired effective lengths of adjustment, as determined by the spacing of the set of columns 2 in erecting the structure.

The tie rods 6 serve as spacing and tying means for the lower ends of the columns. To facilitate adjustment of the clamp rings 4, these can be supported on pins 9 which are chained to the columns and are adapted to be set in desired perforations arranged in a row along the length of the lower portion of each column 2.

The upper end of each column has a row of perforations 11 and along the column, there is slidable, a substantial sleeve 12 preferably having a system of rollers 13 embracing the sides of the column 2 to facilitate shifting of the collar as by draft on a rope or chain 14 passing over a crown pulley 15 hung on the top of the column 2 and adapted to be snatched around a cleat 16 provided therefor on the upper end of the column 2. The collars 12 on the several columns 2 can be temporarily hung by the flexible connection 14 while snatched on the cleat 16 and thereafter, for security, a hook 17, chained suitably to its sliding collar can be dropped into the best available of the row of perforations 11, and then the slidable collar can be dropped for security onto the impaled hook for a safe support.

Each collar 12 is provided with an appropriate bracket arm 20 of suitable length and desired rigidity which is adapted to form the primary support for a platform device. This device is built up of a number of annulus segments 21, each having adjacent each end a king-pinned hole 22, either applicable to a king bolt 23, Fig. 5, or to a king pin 27 in an auxiliary prop later described. Preferably, these platform elements 21 are made of as light sheet metal as consistent with safety, and to increase the rigidity of such a sheet metal element, its longer edges are beaded under as at 21ª, therefore, materially stiffening the element.

In the erection of the carriage, a number of the columns 2 are set up, and their applied clamps and braces 5—6 are adjusted so as to properly position the columns in the desired angular spacing, as is shown in plan in Fig. 1, and then the platform brackets 20 are hoisted to the desired elevation and are set to rest on the hooks 17 as these are inserted in the contiguous openings 11. Then a number of the segmental elements 21 are brought to position and mounted upon the inwardly directed platform brackets 20, the king bolts 23 being passed through the holes 22 which register with respective bolt holes in the brackets 20.

In some cases, it will be desired to build a carriage and platform of such a diameter that the distance between spaced columns 2 will be greater than the distance between the king bolt holes 22 of an individual platform element 21. In such case, the platform elements are lapped end over end intermediately of the relative, spaced columns 2, and a king bolt 27 in the upper end of an adjustable prop 28 is passed through registered king bolt holes of a pair of lapped platform elements 21 so that the meeting ends of the platform elements between a pair of columns are supported on the prop device 28. This device includes upper and lower members 28 and 29 slidably related and adapted to be pinned together by chained pins 30 in desired positions of adjustment, the lower ends of the prop members 29 resting upon the ground.

In order to provide for formation of more or less horse-shoe shaped platforms with indefinite or irregular outlines, each end of each element 21 is provided with a curved row of bolt holes 22' about the relative king bolt holes 22 so that the elements 21 can be adjusted about the king bolts 23 or the king pins 27 as centers to the desired relative position, and then fastened to the brackets 20 by fastening bolts used opposite to the king pins 27.

Preferably, the applied platform elements are drawn snugly down on the top ends of the prop elements by stout springs 33 connecting the applied elements to the prop member 28. Further security is obtained by applying a pin 34' through each of the king pins 27 after the platform is in place; this prevents upward tilt of an applied platform.

Since the elements 21 are provided with bottom beads, it is desirable to use shims 34 and washers 35 as fillers where ends of the platform elements 21 overlap each other; these shims and washers providing stability of the set up parts.

There is shown in Fig. 7 a safety anchor 35 in the form of an extended pick hook which may be pivoted at 36 to the lower part of a column 2 so that when it is necessary to use the rollable carriage on a hillside of such an angle that the carriage would not remain in place, then the anchoring pick hook can be thrust into the ground to prevent accidental rolling of the carriage.

What is claimed is:

A fruit picker's carriage comprising a set of columns, vertically adjustable and horizontally turnable brackets mounted on said columns, means to sustain the adjusted brackets, braces connected to the columns, and a set of platform elements having mutually lapped ends which are pivotally connected for horizontal, relative adjustment and have, each, a row of bolt holes, concentric about the respective pivots, for reception of bolts to fix the elements in angularly adjusted position.

CLAUS E. MILLER.